Feb. 24, 1948.  F. C. ROXY  2,436,485
BOLSTER MECHANISM OF THE FIFTH WHEEL TYPE
Filed Feb. 7, 1945
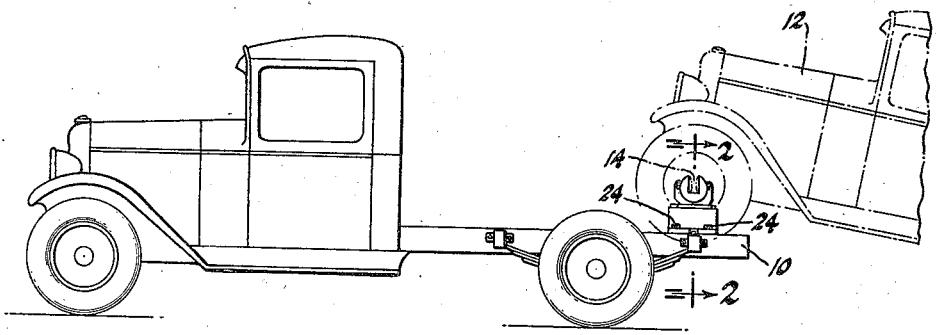
Fig. 1
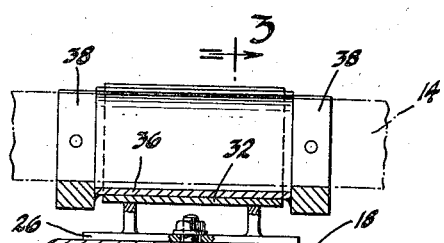
Fig. 2
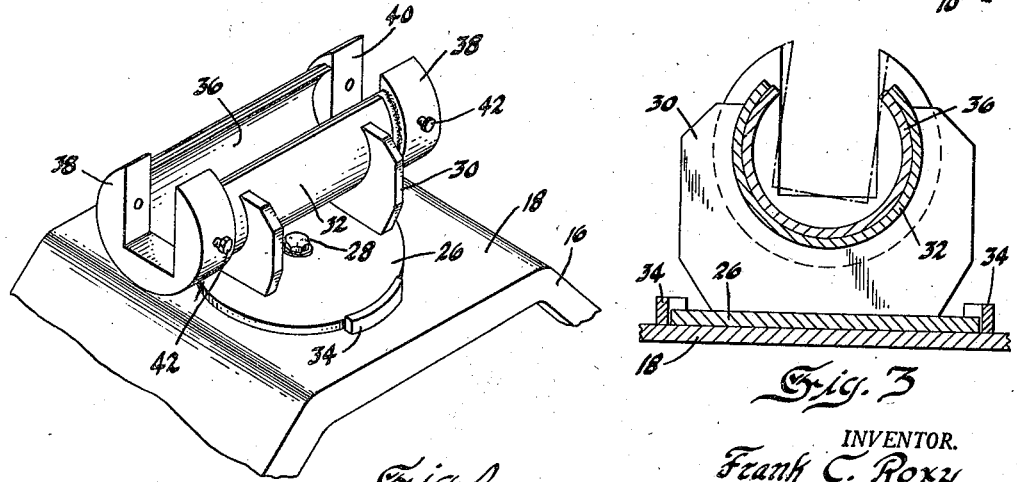
Fig. 4
Fig. 3
INVENTOR.
Frank C. Roxy
BY
Parker & Burton
attorneys Patented Feb. 24, 1948

2,436,485

UNITED STATES PATENT OFFICE 2,436,485

BOLSTER MECHANISM OF THE FIFTH WHEEL TYPE

Frank C. Roxy, Detroit, Mich., assignor to Dan M. Schoonover and Albert Franta, both of Van Dyke, Mich.

Application February 7, 1945, Serial No. 576,547

8 Claims. (Cl. 280—33.1)

This invention relates to improvements in bolster mechanism of the fifth wheel type particularly designed to support the front axle of a truck upon the rear end of another vehicle for haul away purposes.

An object is to provide such a bolster mechanism which is simple and inexpensive and is of rugged construction and which will receive the front axle of a haul away truck to support the front end of such haul away truck whereby it may be readily and conveniently towed by the vehicle equipped with the bolster.

In the transportation of vehicle from the point of manufacture or from a distribution point to other parts of the country it is common practice to provide a driver for one vehicle which driver occupied vehicle is employed to tow a second vehicle. It is also common practice to elevate the front end of the towed vehicle and support it upon the rear end of the towing vehicle. To support the towed vehicle upon the rear end of the towing vehicle, a bolster structure of some kind is commonly built up.

An object of the bolster structure herein described is designed to be readily attached to the frame of the towing vehicle and to so support the towed vehicle as to accommodate the various angular movements which occur between the towed vehicle and towing vehicle during travel over the road. This improved bolster structure is also so designed as to be convenient for storage and transportation in order that it may be returned to its place of origin.

Another object is to provide such a bolster mechanism which is so constructed as to permit angular fifth wheel turning of the towed vehicle with respect to the towing vehicle and which towed vehicle has its front axle so rockably cradled upon the bolster as to permit rockable movement about a horizontal axis as the vehicles travel on even road surfaces, and which bolster mechanism may be quickly and conveniently attached to or detached from a truck frame and which is light in weight and convenient for handling, storage and shipment.

Other objects, advantages and meritorious features will more fully appear from the following description, appended claims and accompanying drawings, wherein:

Figure 1 is a side elevation of a truck provided with this improved bolster mechanism supporting the front end of another truck.

Figure 2 is a sectional view through the bolster taken on line 2—2 of Figure 1.

Figure 3 is a sectional view taken on the line 3—3 of Figure 2.

Figure 4 is a perspective of a fragment of the bolster mechanism.

In the drawing, the side frame members of the towing vehicle are indicated as 10. The towed vehicle is indicated as 12 and is provided with a front axle 14. In Figure 1 the wheels are shown as removed from the front axle of the towed vehicle for purpose of clarity and illustration. The bolster mechanism which forms the basis of this application comprises a bolster frame member 16 which is in the form of an inverted U and which defines an upper platform surface 18. The ends 20 of the frame member are provided with clips 22 held thereto by bolts 24 whereby the bolster frame may be quickly attached to the channel side frames 10 of the towing vehicle. Each clip engages the under surface of the upper flange of the side frame of the towing truck. Each clip is shown as held by two bolts 24 to an end 20 of the frame member, and such end portion is shown as provided with a cut-out 25 adapted to be received over a rivet carried by the frame 10.

Cradle mechanism is journaled upon the supporting surface 18 and this cradle mechanism comprises a cradle support which includes a circular plate 26, which plate is rotatably supported upon the platform 18 being pivoted thereto by means of a bolt or king pin 28, and which plate is provided with a pair of upright supports 30 which carry an upwardly open tubular support 32. The platform supporting surface 18 is provided with fore-and-aft upright arcuate ledges 34 adjacent the circumference of the circular plate 26 and designed to relieve the king pin 28 of strain.

A cradle is formed from an upwardly open tubular section 36 provided at opposite ends, beyond the ends of the support 32, with end blocks 38. These end blocks 38 are welded or otherwise secured to the ends of section 36 and are notched as at 40 to receive therein the front axle of a vehicle to be towed. Pins 42 or the like are threaded through the end blocks 38 to hold the axle in place therein. The cradle section 36 is rotatably seated within the tubular support 32 as shown in the figures of the drawing for rockable movement about the common axis of these two tubular sections. The tubular section 36 preferably projects beyond the margin of the opening in the tubular section 32 so as to facilitate rockable movement of the towed vehicle with respect to the towing vehicle.

It is apparent that when the front axle of the towed vehicle is supported within the cradle that full fifth wheel turning movement between the two vehicles is provided for by the rotatable movement of the cradle supporting plate 26 about the king pin 28 and in addition the towed vehicle may rock with the cradle section 36 within the section 32 about a horizontal axis to accommodate for uneven road conditions. The bolster mechanism may be quickly attached to the rear end of a towing vehicle and the front axle of a vehicle to be towed may be quickly placed therein and secured in position for towing.

What I claim is:

1. In bolster mechanism of the character described, a bolster frame, a fifth wheel journaled thereupon for rotation about a vertical axis and an axle supporting cradle journaled upon the fifth wheel for rockable movement about a horizontal axis and comprising an upwardly open channel part arcuate in cross section fixed to and extending diametrically of the fifth wheel and an upwardly open channel part arcuate in cross section rockably mounted within said first mentioned channel part.

2. In bolster mechanism of the character described, a bolster frame, a fifth wheel plate supported in a flat horizontal position thereupon for rotation about a vertical axis, said fifth wheel plate defining a horizontal tubular arcuate cradle support superimposing the vertical axis and a horizontal arcuate tubular axle supporting cradle nested within said support and rockable movement about a horizontal axis.

3. In bolster mechanism of the character described, a bolster frame, a fifth wheel journaled thereupon for rotation about a vertical axis, said fifth wheel defining a horizontal upwardly arcuate cradle support superimposing the vertical axis and an upwardly open axle supporting arcuate cradle received and journaled within said support for rockable movement about a horizontal axis extending diametrically the vertical axis.

4. In bolster mechanism, a bolster frame defining a supporting platform, a fifth wheel plate supported in a flat horizontal position upon said platform for rotation about a vertical axial pivot, an upwardly open tubular cradle support mounted upon and extending horizontally and diametrically of said plate, an upwardly open arcuate tubular cradle journaled within said support for rockable movement about a horizontal axis and means for releasably securing an axle within said cradle for support thereby.

5. In bolster mechanism, a bolster frame defining a supporting platform, a fifth wheel plate journaled upon said platform for rotation about a vertical axis, an upwardly open cylindrical cradle support mounted upon said plate and extending horizontally thereof, an upwardly open cylindrical cradle mounted within said cradle support for rockable movement about its horizontal axis, said cradle provided with upwardly open U shaped end portions disposed beyond the ends of the cradle support and adapted to receive an axle, and means for securing an axle therein for support thereby.

6. In bolster mechanism a bolster frame exhibiting a fifth wheel supporting horizontal platform, a fifth wheel circular plate supported flat upon said platform for rotation about a vertical axial king pin, said platform provided with upstanding fore-and-aft ledges adjacent to the circumference of said plate to relieve the king pin of radial thrust on the plate, an axle supporting cradle mounted upon said plate for rockable movement about a horizontal axis and means for securing an axle within said cradle for support thereby.

7. In bolster mechanism an inverted U shaped bolster frame provided at its ends with means whereby it may be secured to the frame of a truck, a fifth wheel journaled upon the inverted bottom of said frame for rotation about a vertical axis and an upwardly open channel shaped axle supporting horizontally extending cradle journaled upon said fifth wheel for rockable movement about a horizontal axis.

8. In bolster mechanism, a bolster frame having ends adapted to be secured to vehicle chassis, said frame defining intermediate its ends a supporting platform, a pair of tubular sections one supported within the other for relative rotation about its linear axis, said sections provided with corresponding linear slots, means supporting the outer tubular section upon said platform for rotation about a vertical axis, means for securing an axle within the inner tubular section for support thereby.

FRANK C. ROXY.

REFERENCES CITED

The following references are of record in the file of this patent:

UNITED STATES PATENTS

| Number | Name | Date |
| --- | --- | --- |
| 1,445,754 | Casey | Feb. 20, 1923 |
| 1,662,923 | Hume | Mar. 20, 1928 |
| 2,152,279 | Randall et al. | Mar. 28, 1939 |